UNITED STATES PATENT OFFICE.

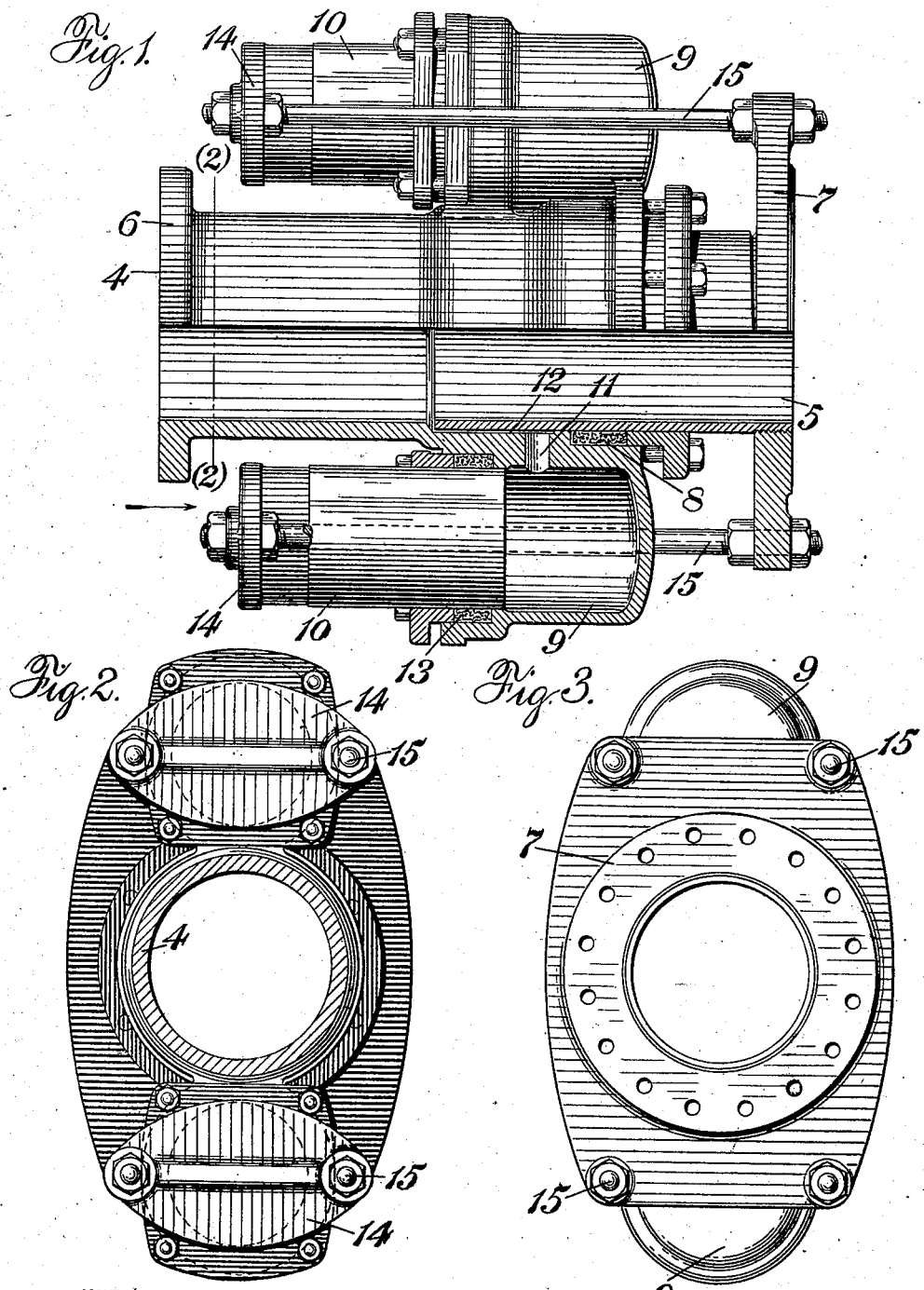

WILLIAM W. DOOLITTLE, OF EVANSTON, ILLINOIS, ASSIGNOR TO CRANE COMPANY, OF CHICAGO, ILLINOIS, A CORPORATION OF ILLINOIS.

EXPANSION-JOINT.

No. 853,964.            Specification of Letters Patent.            Patented May 21, 1907.

Application filed December 9, 1905. Renewed February 19, 1907. Serial No. 358,241.

*To all whom it may concern:*

Be it known that I, WILLIAM W. DOOLITTLE, a citizen of the United States, residing at Evanston, in the county of Cook and State of Illinois, have invented certain new and useful Improvements in Expansion-Joints, of which the following is a specification.

The invention relates to expansion joints for pipes in which telescoping portions are used to provide for the lengthening and shortening of the pipes because of pressure and expansion from heat. The objects of this invention are; to provide an improved joint of this kind in which means are provided for holding the telescoping portions in place so that such portions while held yieldingly may not be disengaged by the pressure in the pipe, and to provide an expansion joint in which the yielding holding means are controlled by pressure from the pipe and in which such holding means are so constructed and arranged as to avoid leaking. One form of the invention is illustrated in the accompanying drawings, in which—

Figure 1 is a side elevation of the joint with the lower half thereof broken away to show the interior of the parts;

Figure 2 is a section on the line (2) (2) of Figure 1, looking in the direction of the arrow, and Figure 3 is an end view looking toward the right hand end of Figure 1.

In telescoping expansion joints the pressure on the pipe tends to separate the parts, as also does a sudden flow of steam, where the joint is located near a turn in the pipe. Some means must therefore be provided to permit of the sliding action of the telescoping parts and at the same time restrict such motion. Applicant's invention is intended to provide a joint of this kind. Applicant's joint consists of two telescoping members adapted to be secured to the two sections of pipe to be joined, and one of the parts of this joint is provided with a set of cylinders having port connections to the section, and the other section is provided with a plurality of plungers for the cylinders of such a size that the pressure in the cylinders counterbalances any pressure in the pipe tending to separate the telescoping members. As shown in the drawings, 4 is one of the telescoping joint sections and 5 is the other. These sections are provided with flanges 6 and 7 respectively, which are provided with holes whereby such flanges may be bolted to the two sections of pipe between which the joint is to be placed. The part 5 telescopes inside the part 4 and is provided with a stuffing box 8. The means for holding the parts of the joint in yielding engagement consist in the present case of two cylinders 9, with their plungers 10. The cylinders 9 have port connections 11 with the interior of the pipe whereby pressure is secured for operating such cylinders. It will be noted that the joint section 4 is counter bored at 12 and that the port 11 leads into the end of such counter bore, the object being to provide a construction in which the telescoping of the part 5 through the part 4 will not at any point of travel interfere with the admission of pressure fluid into the cylinders 9. The cylinders 9 are each provided with stuffing boxes 13, and, as the plunger is of uniform size from end to end, the construction affords a much tighter joint than if a short piston with a piston rod were used. The end of each of the plungers 10 is provided with a cross head 14, the ends of which cross heads have bolts 15 connecting them with the flange 7 of the telescoping part 5. Two cylinders are shown in the drawing, but it is apparent that if desirable a larger number might be used. The plungers are of such size that their combined area is sufficient to counterbalance the steam pressure tending to separate the telescoping parts longitudinally. The rods 15 are connected with the cross head 14 forming a yoke and placed on the outside of the cylinders 9 in order to avoid the necessity of packing such rods, which would have to be done if the rods 15 were secured in the right hand ends of the plungers 10, and passed out through the rear ends of the cylinders. It will be apparent that my invention as shown is capable of considerable modification, as for instance, multiplying the number of cylinders increasing the number of rods 15 for each cross head and varying the mode of connection for such rods, all of which however, is within the scope of my invention and is comprehended by the claims.

Having thus described my invention and illustrated its use, what I claim as new and desire to secure by Letters Patent, is the following:

1. In combination an expansion joint comprising telescoping parts, cylinders secured to one part of the joint and having connections for the admission of fluid pressure, plungers working in the cylinders, and connections outside of the cylinders between the plungers and the other telescoping part.

2. In combination an expansion joint comprising telescoping parts, cylinders secured to one part of the joint and provided with passages leading to such part, plungers working in the cylinders and provided with cross heads, and connections outside of the cylinders between the cross heads and the other telescoping part.

3. In combination an expansion joint comprising telescoping parts, a cylinder secured to one part of the joint and rearwardly facing with respect thereto and having a connection for the admission of fluid pressure, a plunger working in the cylinder and having connections outside of the cylinder with the other telescoping part of the joint.

4. In combination an expansion joint, comprising telescoping parts, cylinders secured to one part of the joint and provided with passages leading to such part, plungers working in the cylinders and provided with cross heads and connections between the extremities of the cross heads and the other telescoping part.

5. In combination an expansion joint comprising telescoping parts, cylinders secured to one part of the joint and provided with passages leading to such part and with stuffing boxes, plungers of such size as to fit both the cylinders and the stuffing boxes, cross heads on the plungers, and connections between the extremities of the cross heads and the other telescoping part.

6. In combination an expansion joint comprising telescoping parts, cylinders secured to one part of the joint, and provided with passages leading to such part and with stuffing boxes, plungers of such size as to fit both the cylinders and the stuffing boxes and connections outside the cylinders between the plungers and the other telescoping part.

7. In combination a telescoping joint comprising telescoping members, one of such members being counter bored, cylinders mounted on this member and having passages leading to the counterbores, plungers in the cylinders and connections outside of the cylinders between the plungers and other telescoping member.

8. In combination an expansion joint comprising telescoping members, one of which is provided with a flange, cylinders secured to the other part and provided with passages leading to such part, plungers working in the cylinders and provided with cross heads, and connections between the extremities of the cross head and the flange of the other telescoping part.

In testimony whereof I have hereunto signed my name in the presence of the two subscribed witnesses.

WILLIAM W. DOOLITTLE.

Witness:
PAUL CARPENTER,
ALBERT GRANT MILLER.